Aug. 10, 1965   E. THOMAS ET AL   3,199,192
CAN PIERCING AND CUTTING TOOL
Filed Feb. 28, 1963   3 Sheets-Sheet 1

STATIONS

INVENTORS
ERNEST THOMAS
MARK J. RODMAN
BY

Aug. 10, 1965                E. THOMAS ET AL                3,199,192
                         CAN PIERCING AND CUTTING TOOL
Filed Feb. 28, 1963                                      3 Sheets-Sheet 2
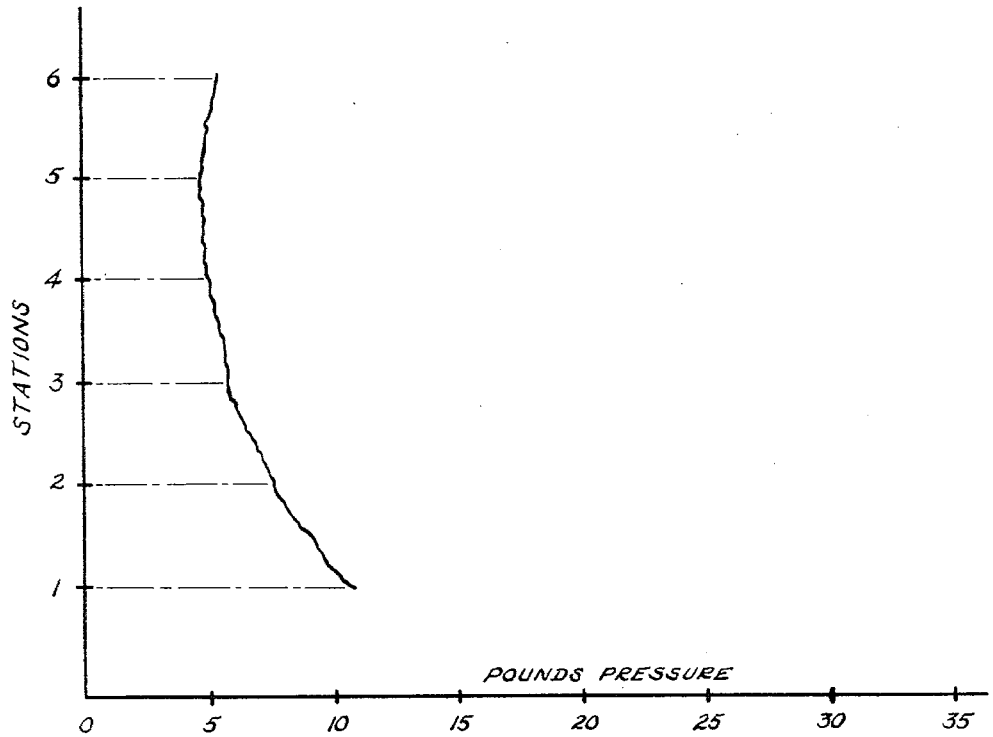
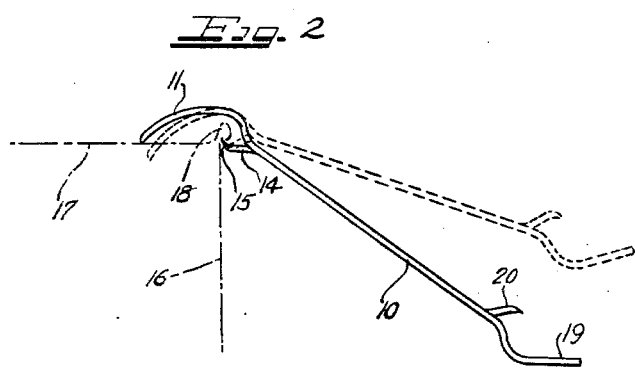
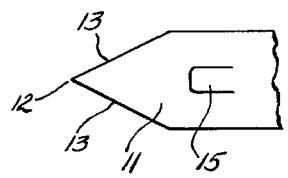
INVENTORS
ERNEST THOMAS
MARK J. RODMAN
BY

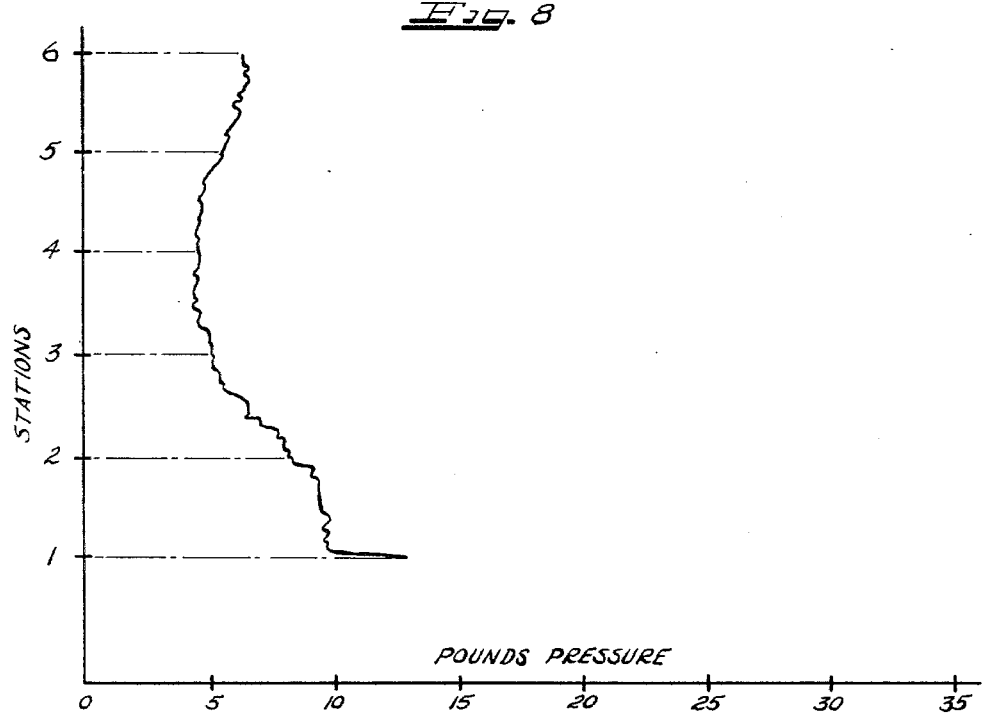
Fig. 8
Fig. 4
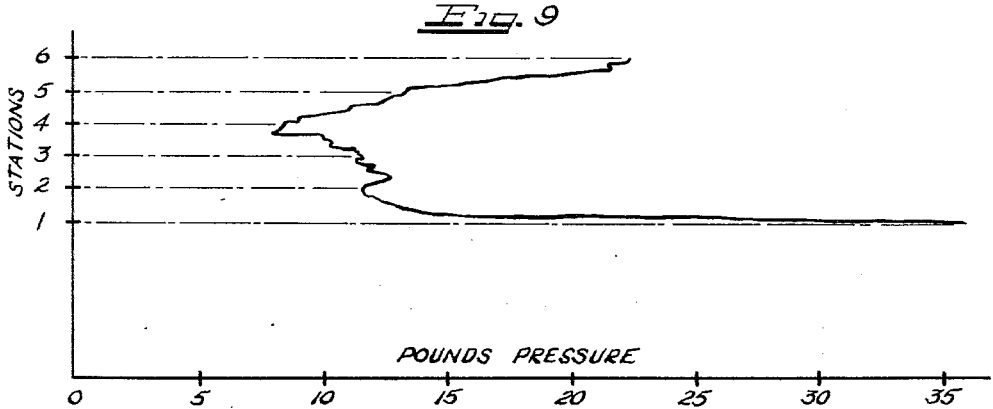
Fig. 9
Fig. 5
INVENTORS
ERNEST THOMAS
MARK J. RODMAN

United States Patent Office 3,199,192
Patented Aug. 10, 1965

3,199,192
CAN PIERCING AND CUTTING TOOL
Ernest Thomas, Roselle, and Mark J. Rodman, Mundelein, Ill., assignors to Ekco Products Company, Chicago, Ill., a corporation of Delaware
Filed Feb. 28, 1963, Ser. No. 261,666
5 Claims. (Cl. 30—16)

This invention relates to a can end wall piercing and cutting tool for producing a pouring opening via a blade having a sharp cutting point and opposite edges extending rearwardly from said point along uniformly diverging lines which come into cutting operation as the blade point and blade edges are rocked forwardly and downwardly through said can end wall while fulcrumed on the bead of the can along the surface of a tang on said tool in spaced underlying relation to said blade.

The principal object of this invention is to provide an improved tool of this character which will effect piercing of the can top and cutting of the can top by a continuous forward and downward movement of the blade without application of sharply fluctuating rates of pressure during such action and thereby avoiding jagged edges at the side of the opening which interfere with withdrawal of blade from the cutting area.

In a preferred embodiment of this invention, the blade is curved rearwardly and upwardly from its pointed end along an arc of a circle having a radial dimension substantially equal to the chordal dimension of said arc and a tang projecting into the area below the blade cooperates with the bead at the edge of the can wall undergoing cutting action via a forwardly and upwardly extending edge portion which occupies a position at a distance below said blade measured along a line extending radially of said circle and containing the edge portion of said tang approximately one-fifth the length of said radially extending line.

For a better understanding of the invention, reference may be had to the following description and the accompanying drawing, in which:

FIG. 2 is a side view having a portion in full lines representing a tool according to the present invention in an initial position preparatory to entering the end wall of a container, and a dotted line portion showing the tool in a position intermediate a final cutting position and said initial position.

FIG. 3 is a fragmentary bottom view of the tool shown in FIG. 1.

FIG. 4 illustrates a tool having a relatively flattened blade of the type heretofore commonly available.

FIG. 5 illustrates a second tool of a type heretofore available and having a blade of still more flattened character.

Figure 6:
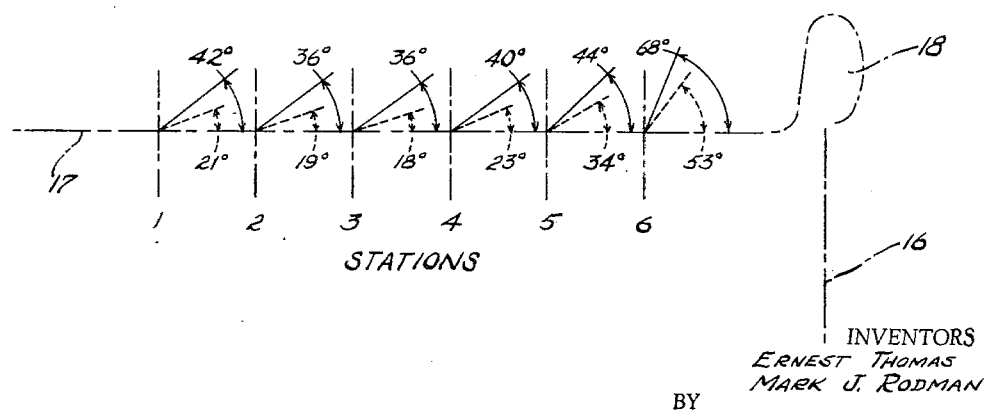

FIG. 6 is a graphic illustration showing in full lines angular positions of the blade of the tool of this invention and showing dotted line angular positions of the blade of the tool shown in FIG. 4, with reference to and at various stations along the surface of the can end wall as said blades are respectively progressively moved incident to the completion of a pouring opening cutting operation on said end wall of the can.

FIG. 7 is a graphic illustration showing rates of upward pressure applied to the handle plotted against distance travelled by the blade along a can end wall incident to operation of a tool embodying the features of this invention to form a pouring opening in said can end wall.

FIG. 8 is similar to FIG. 7 but showing pressure conditions which prevail incident to operation of a tool as shown in FIG. 4 to form a pouring opening in a can end wall.

FIG. 9 is similar to FIG. 7 showing pressure conditions incident to operation of a tool as shown in FIG. 5 to form a pouring opening in a can end wall.

A tool incorporating the features of the present invention is preferably formed from a strip of steel of about .060 thickness and of such width, for example ¾ inch, as to present opposite longitudinal edge portions at such distance apart as to provide an elongated handle portion 10 about which the fingers of a user's hand may be comfortably flexed in operating the tool.

Figure 1:
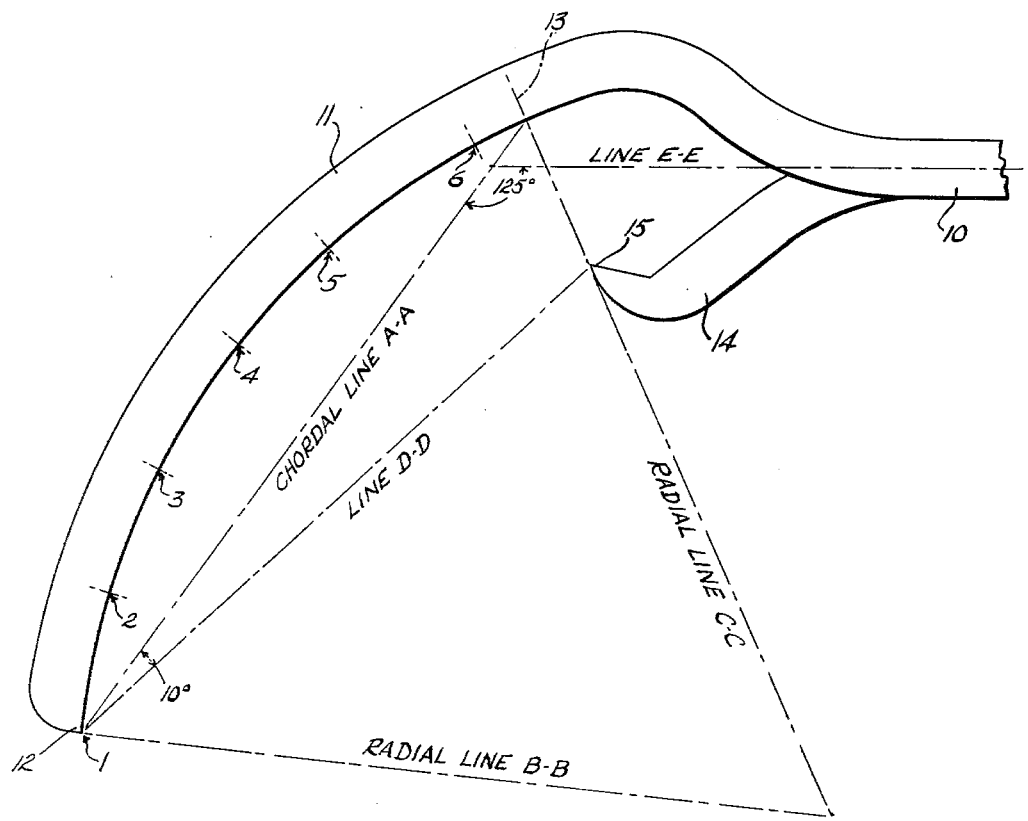
FIG. 1 is an enlarged fragmentary side view of a tool incorporating the features of this invention.

The forward end portion of the tool, and from which said handle portion 10 extends rearwardly, includes a blade 11 having a relatively sharp point 12 from which opposite edges 13 of the blade diverge uniformly in the direction of the handle 10. Throughout the distance said edges 13 extend rearwardly from said point 12, the forward end portion is curved along the arc of a circle having a chordal dimension (as indicated by chordal line A—A in FIG. 1) approximately equal to the radial dimension of said circle (as indicated by radial line B—B in FIG. 1) with the concave side of said curved end facing downward. The handle portion 10 extends along an axis (line E—E in FIG. 1) in such relation to the chordal line A—A as to define a downwardly facing angle of approximately 125 degrees between said chordal line A—A and axis of the handle.

Reference numeral 14 designates a tang which is sheared from the material of the tool along lines extending forwardly of the handle portion 10 so as to project forwardly and downwardly from said handle portion 10 into the area below the blade 11. The tang 14 presents a forwardly and upwardly extending sharp edge portion 15 which coincides with a radial line C—C (see FIG. 1) drawn radially of the circle on which the arcuate curvature of the blade is established and combining with lines A—A and B—B to define an equilateral triangle. The distance said edge portion 15 is positioned below said blade 11 measured along line C—C is approximately one-fifth the length of line C—C. It will also be noted from FIG. 1 that the chordal line A—A and a line D—D containing the blade point 12 and the edge 15 of tang 14 define an angle of approximately 10 degrees.

FIG. 2 illustrates a well known type of sheet metal container with which the tool forming the subject of this invention is specifically applicable for the purpose of forming a pouring opening, said container having a side wall 16 and end or top wall 17 and an upwardly extending bead 18 defining the seam along which said side wall and end wall are joined about the periphery of said wall 17. The bead 18, as shown in FIG. 2, provides a fulcrum with which the edge 15 of the tang 14 has upward engagement, whereby the tool is rockable in response to upward pressure applied on the handle 10. Such rocking movement causes the point 12 of the blade 11 to initially contact the end wall 17 of the container at such time as the blade and the surface of the end wall 17 underlying the blade 11 define an angle of approximately 42 degrees. Continual rocking movement of the tool under further upward pressure on the handle 10 causes the point to enter the end wall 17 and the edges 13 of the blade to cut a wedge shaped pouring opening.

While the size and shape of the pouring opening is controlled by the size and shape of the blade 11, it has been found that the angular relationship established between the blade of the tool of this invention and the top of the can undergoing puncturing and cutting action of said tool presents advantages not obtainable in former tools of this type wherein such angular relationship was absent.

The progress of the blade 11 between said initial position in which the point 12 is about to penetrate the can end wall 17 and a final position in which the point 12 encounters engagement with the inner surface of the can side wall 16 (which coincides with the completed state of the pouring opening in the can end wall 17) is represented by a series of uniformly spaced apart stations numbered 1 to 6 inclusive along the lower limits of FIG. 6. Angularity of the blade 11 in relation to the can end wall 17 as shown in FIG. 6 is based on the angle defined by a first straight line substantially coplanar with the end wall 17 of the can and a second straight line which meets said first line at the surface of said end wall undergoing shearing action by the blade 11 and perpendicular to a line extending radially of the arc on which the blade is curved. The full line portions, as shown in FIG. 6, indicate the degree of angularity of the blade 11 in relation to the can end wall 17 at each of the successive stations arrived at by the blade 11 during a full working stroke of the tool forming the subject of this invention. The dotted lines on FIG. 6 indicate the comparative degree of angularity of the blade 11a in relation to the can end wall at each of said stations as the tool shown in FIG. 4 is progressively rocked between an initial position and a final position corresponding to station 6 in FIG. 6. It will be noted therefrom that during travel of the blade 11 from station 1 through station 3 (which represents one-half of the total distance travelled in producing the pouring opening) the angle is subtantially twice that defined by the blade 11a at the corresponding stations 1, 2 and 3. During travel of the blade 11 through stations 4 and 5, the angularity is increased less than four degrees while that of the blade 11a through said stations 4 and 5 the angularity is abruptly increased 14 degrees. Thus the variation in angularity during travel of blade 11 from stations 1 to 5 inclusive is only 8 degrees while the total variation in angularity during travel of blade 11a from stations 1 to 5 inclusive is 16 degrees. This wide range of variation tends to require greater fluctuation in rate of pressure needed to rock the blade 11a through stations 1 to 5 as compared to the smaller range of variation in angularity which is encountered in rocking the blade 11 through stations 1 to 5. The relatively even rate of pressure to which the blade 11 responds in travelling through the stations 1 to 6 inclusive, as graphically shown in FIG. 7, is to be noted in contrast to the relatively sharp fluctuations in rate of pressure applied in operation of blade 11a through the stations 1 to 6 inclusive, as shown graphically in FIG. 8. The chart shown in FIG. 9 indicates comparable rate of pressure fluctuations encountered in operating the blade 11b of the tool shown in FIG. 5 incident to travel of said blade through stations 1 to 6 inclusive, corresponding to the stations 1 to 6 as represented in FIGS. 7 and 8.

The benefits which are obtainable by virtue of the relatively gradual varying rates of pressure used in operating the tool of this invention, as thus graphically depicted in FIG. 7, are manifested by the absence of abrupt and jagged areas along the edges of the pouring opening as compared to the rough condition of the edges of the pouring opening produced by the blade 11a of the tool shown in FIG. 4 and the blade 11b of the tool shown in FIG. 5. The elimination of such rough conditions along the edges of the finally completed pouring opening not only reduces the hazard of injury to the user of the can but it prevents any drag on the blade as the blade is withdrawn from the finished opening.

The rearward end portion of the tool is also formed with a projecting hook 19 and lug 20 underlying said hook to provide a cap-lifting member at the rear end of the tool. Such treatment of the rearward end of the tool is not an essential feature but is simply an auxiliary element which may be used or omitted.

What is claimed is:

1. A metal can end wall piercing and cutting tool, said tool having an elongated flat handle portion and a blade from which said handle portion extends rearwardly, said blade having a sharpened point from which longitudinal edge portions of the blade diverge uniformly rearwardly to define the forward end portion of the tool, said forward end portion being curved rearwardly from said point along the arc of a circle having a radial dimension approximately equal to the chordal dimension of said arc with the concave side facing downwardly, and an integral tank extending forwardly and downwardly of said handle into the area below said forward end portion of the tool, said tang having a forwardly and upwardly extending sharpened edge which occupies a position along a straight line from substantially the rear terminal of said arc and drawn radially of said circle at a distance below said forward end portion approximately one-fifth the total length of said radially extending line, said tang edge when positioned in upward and forward engagement with the peripheral bead of a can end wall providing a fulcrum on which said tool is rockable incident to upward pressure on the handle portion from an initial position wherein the point of the blade is in downward engagement with the upper surface of the can end wall surrounded by said bead to an advanced position wherein the point of the blade is below said can end wall and said blade and the can end wall surface underlying said tool define an angle of not less than 60 degrees, said blade thereby performing a cutting action on the material of the can end wall without application of sharply fluctuating rates of upward pressure on the handle during such movement of the tool from initial to advanced position.

2. A can end wall piercing and cutting tool according to claim 1, wherein the blade and the underlying can end wall surface define an angle of not less than 42 degrees when said tool is in said initial position.

3. A can end wall piercing and cutting tool according to claim 1, wherein said rearwardly diverging edges of the blade are coterminous with the arc on which the forward portion of the tool is curved.

4. A can end wall piercing and cutting tool according to claim 1, wherein a straight line connecting said edge of the tang and said point of the blade extends downwardly and rearwardly of the forward end of said chordal line of said arc at an angle of approximately 10 degrees.

5. A can end wall piercing and cutting tool according to claim 1, wherein said handle portion of the tool extends rearwardly along a line intersecting the chordal line of said arc in such angular relation as to define a downwardly facing angle of approximately 125 degrees between said chordal line and said handle line.

References Cited by the Examiner
UNITED STATES PATENTS

| | | | |
|---|---|---|---|
| 1,996,550 | 4/35 | Sampson et al. | 30—16 |
| 2,455,496 | 12/48 | Kaskouras | 30—16 |
| 2,546,257 | 3/51 | Eckman | 30—16 |
| 2,579,930 | 12/51 | King | 30—16 X |
| 2,611,950 | 9/52 | Kaskouras | 30—16 |
| 2,773,272 | 12/56 | Harrah | 30—16 X |
| 2,986,812 | 6/61 | Arter et al. | 30—16 X |

WILLIAM FELDMAN, *Primary Examiner.*